UNITED STATES PATENT OFFICE.

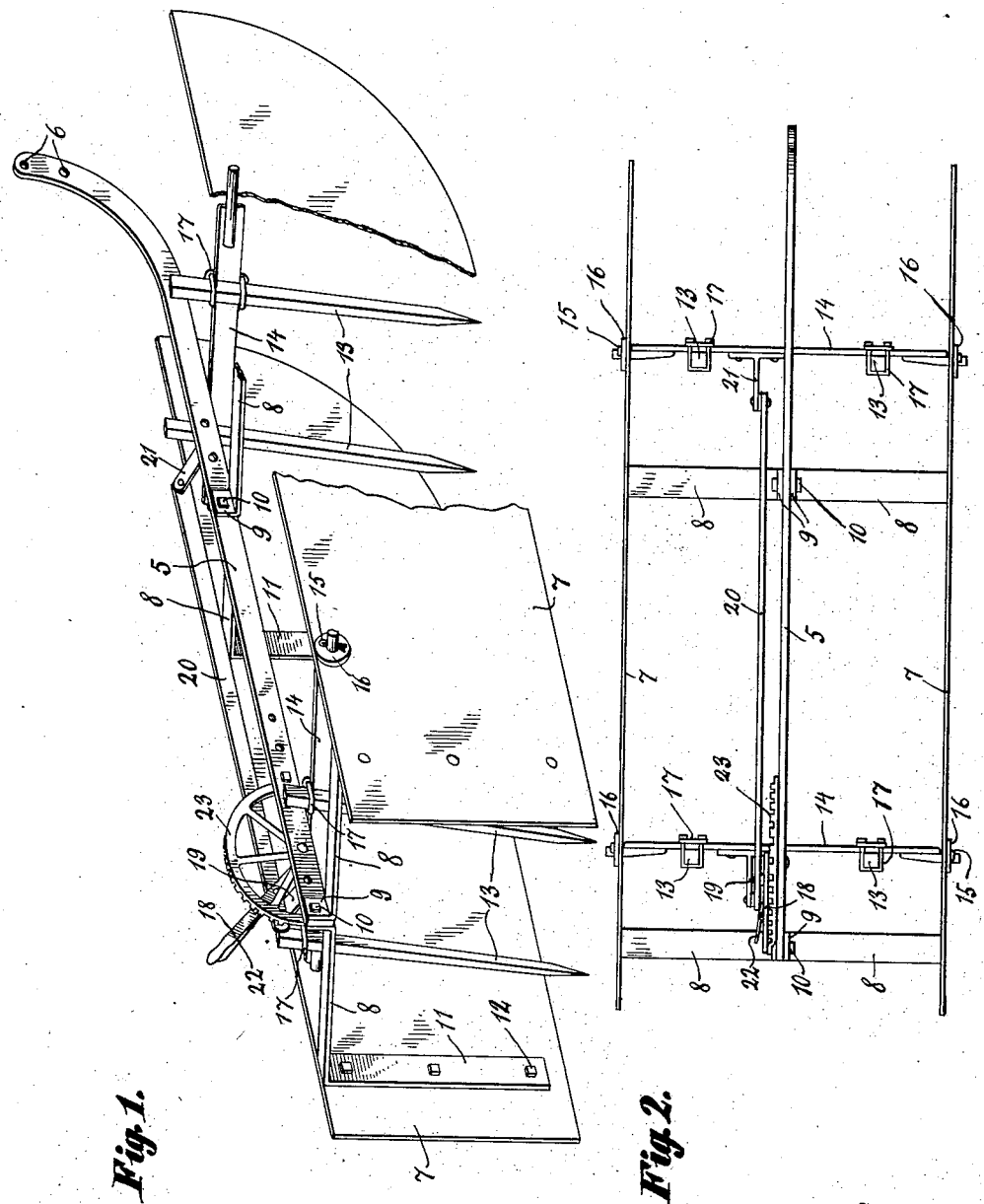

JAMES C. BRAND, OF ST. JOSEPH, MISSOURI.

COMBINED HARROW AND SHIELD.

1,025,118.  Specification of Letters Patent.  Patented May 7, 1912.

Application filed July 18, 1911. Serial No. 639,109.

*To all whom it may concern:*

Be it known that I, JAMES C. BRAND, a citizen of the United States, residing at St. Joseph, in the county of Buchanan and State of Missouri, have invented certain new and useful Improvements in Combined Harrows and Shields, of which the following is a specification.

The attachment which is the subject of the present invention is a combined harrow and fender, the same being designed to enable corn or other crops to be cultivated as closely as desired.

It is the object of the invention to provide an attachment of the kind stated embodying certain novel features of construction to be hereinafter described and claimed, and furthermore, to provide improved means for throwing the harrow teeth out of operation.

In order that the invention may be better understood, reference is had to the accompanying drawing forming a part of this specification, in which drawing—

Figure 1 is a perspective view of the attachment, partly broken away, and Fig. 2 is a plan view thereof.

Referring specifically to the drawing, 5 denotes a longitudinal beam which carries the attachment. The front end of the beam has an upward bend which is provided with apertures 6 to receive suitable fastening means for attaching the beam to the cultivator, the latter not being shown as it forms no part of the present invention. The beam may be secured to any convenient part of the cultivator, and it is not necessary to modify or alter the structure of the latter.

The fenders comprise two sheet metal plates 7 which are arranged longitudinally on opposite sides of the beam 5 to which latter they are secured in spaced relation by cross bars 8 having upward bends 9 at their inner ends between which the beam is received, and through which parts bolts 10 pass for fastening the same together. The outer ends of the cross bars have downward bends 11 to which the fenders are secured by bolts 12, the bends being located on the inside of the fenders. The front edges of the fenders are curved as shown in Fig. 1 in order that they may ride freely over the ground.

Between the fenders, near the front and rear ends thereof, are harrow teeth 13 which are carried by rock shafts 14 extending transversely between, and journaled at their ends in bearing apertures made in the fenders. The shafts are secured in the bearings by cotter pins 15 and washers 16. Suitable clamps 17 secure the harrow teeth to the shafts. The teeth may be ordinary spike teeth.

The rock shafts 14 are provided in order that the harrow teeth 13 may be swung upwardly into inoperative position, this being done by a hand lever 18 connected to a rocker arm 19 extending from the rear shaft, and also connected by a link 20 to a rocker arm 21 extending from the front shaft, both sets of harrow teeth being thus simultaneously thrown out of action. The hand lever is fulcrumed to the beam 5, and is provided with an ordinary spring latch 22 engageable with a toothed sector 23 mounted on the beam.

I claim:

The combination of a longitudinal beam having attaching means, cross-bars extending from opposite sides of the longitudinal beam and having up-turned inner ends between which said beam is located, fastening means passing through said up-turned ends of the cross-bars and the longitudinal beam, the outer ends of the cross-bars terminating in downward bends, supports carried by the downwardly bent outer ends of the cross-bars, transverse rock shafts extending between and carried by the supports, harrow teeth carried by the rock shafts, arms extending from the rock shafts, a link connecting said arms, and a lever fulcrumed on the beam and operatively connected to one of the arms.

In testimony whereof I affix my signature in presence of two witnesses.

JAMES C. BRAND.

Witnesses:
 HOWARD C. VARNER,
 CHAS. F. SCHAAF.

Copies of this patent may be obtained for five cents each, by addressing the "Commissioner of Patents, Washington, D. C."